United States Patent
Atikoglu et al.

(10) Patent No.: US 9,881,328 B2
(45) Date of Patent: *Jan. 30, 2018

(54) SYSTEM AND METHOD FOR AGE VERIFICATION OVER MOBILE APP FOR PURCHASING AGE-RESTRICTED ITEMS

(71) Applicant: WAL-MART STORES, INC., Bentonville, AR (US)

(72) Inventors: Berk Atikoglu, San Francisco, CA (US); Eytan Daniyalzade, San Francisco, CA (US)

(73) Assignee: WAL-MART STORES, INC., Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/497,538

(22) Filed: Apr. 26, 2017

(65) Prior Publication Data

US 2017/0228805 A1 Aug. 10, 2017

Related U.S. Application Data

(63) Continuation of application No. 14/643,900, filed on Mar. 10, 2015, now Pat. No. 9,665,896.

(51) Int. Cl.
*G06Q 30/06* (2012.01)
*G06Q 20/40* (2012.01)

(52) U.S. Cl.
CPC ... *G06Q 30/0609* (2013.01); *G06Q 20/40145* (2013.01)

(58) Field of Classification Search
None
See application file for complete search history.

(56) References Cited

U.S. PATENT DOCUMENTS

| | | | |
|---|---|---|---|
| 6,522,772 B1 | 2/2003 | Morrison et al. | |
| 8,880,434 B2 | 11/2014 | Bemmel et al. | |
| 9,665,896 B2 * | 5/2017 | Atikoglu et al. | G06Q 30/0609 |
| 2003/0018522 A1 | 1/2003 | Denimarck et al. | |
| 2004/0133477 A1 | 7/2004 | Morris et al. | |
| 2007/0129056 A1 | 6/2007 | Cheng et al. | |
| 2009/0152343 A1 | 6/2009 | Carter et al. | |
| 2013/0112746 A1 | 5/2013 | Krell | |
| 2014/0244514 A1 | 8/2014 | Rodriguez et al. | |

* cited by examiner

*Primary Examiner* — Kristy A Haupt
(74) *Attorney, Agent, or Firm* — Bryan Cave LLP

(57) ABSTRACT

A system and method for forecasting sales is presented. A transmission by a customer is received indicating an intention for a customer to purchase an item from a retailer via a mobile device. An embodiment determines if the item is subject to an age-restriction. This can be accomplished by using location data of a retailer. Biometric data is received from the customer intending to purchase the item. The biometric data is compared to verified biometric data to confirm the identity of the customer. The age of the customer is determined. Thereafter, the transaction is allowed to proceed if the age of the customer satisfies the age-restriction for the item. Other embodiments are also disclosed herein.

20 Claims, 7 Drawing Sheets

SYSTEM AND METHOD FOR AGE VERIFICATION OVER MOBILE APP FOR PURCHASING AGE-RESTRICTED ITEMS

CROSS-REFERENCE TO RELATED APPLICATIONS

This application is a continuation of U.S. application Ser. No. 14/643,900, filed Mar. 10, 2015 and currently pending, the contents which are all incorporated herein by reference for all purposes.

TECHNICAL FIELD

This disclosure relates generally to retail businesses, and relates more particularly to security at retail businesses.

BACKGROUND

Typically, when a consumer desires to purchase an item at certain types of retail businesses, the consumer chooses his items, then brings them to a cashier, who determines the amount owed by the consumer. In some instances, the consumer may perform his own check-out duties. In a new method of checking out, a user can utilize handheld technology to purchase items. There is a desire to ensure that age-restricted items are not sold to under-aged customers.

BRIEF DESCRIPTION OF THE DRAWINGS

To facilitate further description of the embodiments, the following drawings are provided in which.

Figure 1:
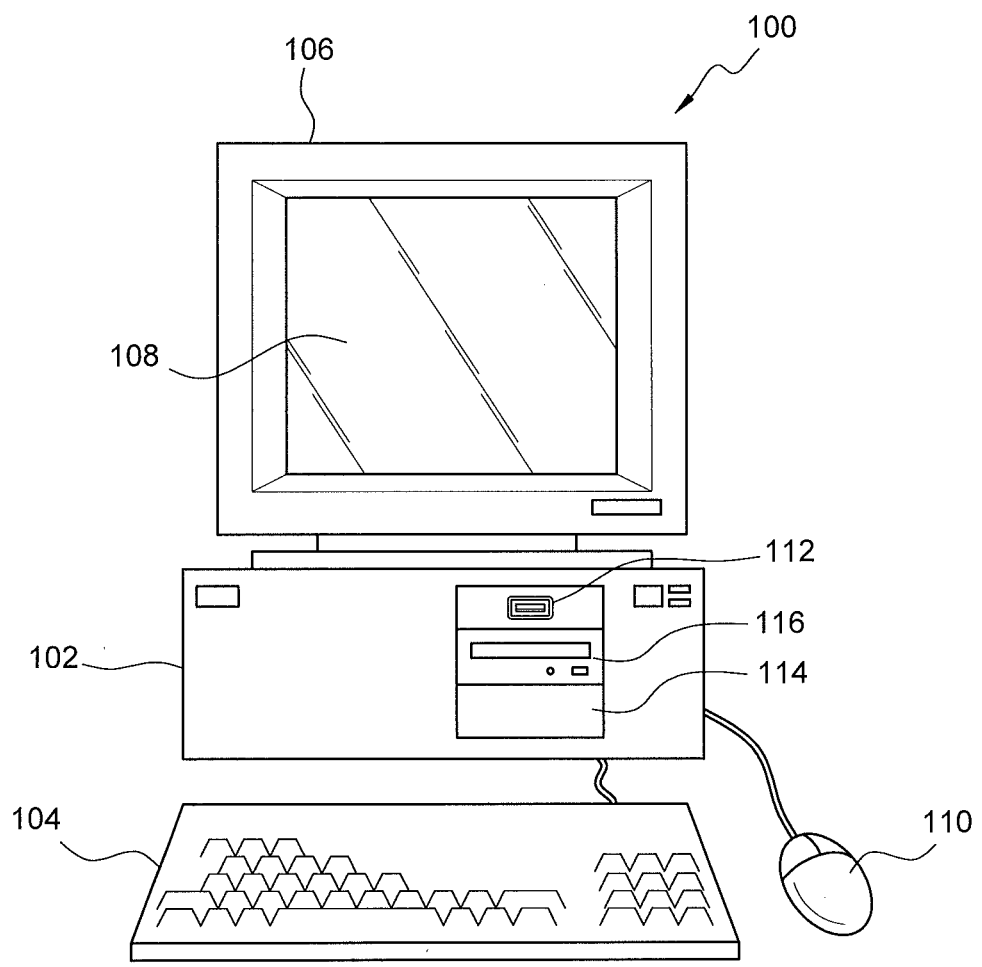
FIG. 1 illustrates a front elevation view of a computer system that is suitable for implementing at least part of a central computer system.

For simplicity and clarity of illustration, the drawing figures illustrate the general manner of construction, and descriptions and details of well-known features and techniques might be omitted to avoid unnecessarily obscuring the present disclosure. Additionally, elements in the drawing figures are not necessarily drawn to scale. For example, the dimensions of some of the elements in the figures might be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but might include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements can be electrically coupled together, but not be mechanically or otherwise coupled together. Coupling can be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Some embodiments include a method. The method can comprise: receiving a transmission indicating an intention by a customer to purchase an item via a mobile device; determining if the item is subject to an age-restriction; receiving biometric data from the customer; confirming an identity of the customer by comparing the received biometric data with verified biometric data of the customer; determining the age of the customer; and allowing a transaction to proceed if the age of the customer satisfies the age-restriction for the item.

Some embodiments include a system. The system can comprise: a user input device; a display device; one or more processing modules; and one or more non-transitory storage modules storing computing instructions configured to run on the one or more processing modules and perform the acts of: receiving a transmission indicating an intention by a customer to purchase an item via a mobile device; determining if the item is subject to an age-restriction; receiving biometric data from the customer; confirming an identity of the customer by comparing the received biometric data with verified biometric data of the customer; determining the age of the customer; and allowing a transaction to proceed if the age of the customer satisfies the age-restriction for the item.

Further embodiments include at least one non-transitory memory storage module having computer instructions stored thereon executable by one or more processing modules to: receive a transmission indicating an intention by a customer to purchase an item via a mobile device; determine if the item is subject to an age-restriction; receive biometric data from the customer; confirm an identity of the customer by comparing the received biometric data with verified biometric data of the customer; determine the age of the customer; and allow a transaction to proceed if the age of the customer satisfies the age-restriction for the item.

Some embodiments include a method. The method can comprise receiving a transmission indicating an intention by a customer to purchase an item via a mobile device. Receiving the transmission indicating the intention by the customer to purchase the item via the mobile device can comprise: receiving the transmission that the customer has scanned, with the mobile device, a unique identifier of the item to be purchased; coordinating a first display of item information on the mobile device of the customer; receiving a purchase confirmation from the mobile device of the customer; coordinating a second display of one or more item suggestions on the mobile device of the customer; and receiving a check-out process initiation from the mobile device of the customer. The method also can comprise determining if the item is subject to an age-restriction. The method also can comprise receiving biometric data from the customer. The method also can comprise confirming an identity of the customer by comparing the biometric data received from the customer with verified biometric data of the customer. The method also can comprise determining an age of the customer. The method also can comprise allowing a transaction to proceed if the age of the customer satisfies the age-restriction for the item.

Further embodiments include one or more processing modules and one or more non-transitory storage modules storing computing instructions configured to run on the one or more processing modules. The one or more non-transitory storage module storing the computing instruction can be configured to run on the one or more processing modules and perform an act of receiving a transmission indicating an intention for a customer to purchase an item from a retailer via a mobile device. Receiving the transmission indicating the intention for the customer to purchase the item from the retailer via the mobile device can comprise: receiving the transmission that the customer has scanned, with the mobile device, a unique identifier of the item to be purchased; coordinating a first display of item information on the mobile device of the customer; receiving a purchase confirmation from the mobile device of the customer; coordinating a second display of one or more item suggestions on the mobile device of the customer; and receiving a check-out process initiation from the mobile device of the customer. The one or more non-transitory storage module storing the computing instruction can be further configured to run on the one or more processing modules and perform an act of determining if the item is subject to an age-restriction. The one or more non-transitory storage module storing the computing instruction can be further configured to run on the one or more processing modules and perform an act of receiving biometric data from the customer. The one or more non-transitory storage module storing the computing instruction can be further configured to run on the one or more processing modules and perform an act of confirming an identity of the customer by comparing the biometric data received from the customer with verified biometric data of the customer. The one or more non-transitory storage module storing the computing instruction can be further configured to run on the one or more processing modules and perform an act of determining an age of the customer. The one or more non-transitory storage module storing the computing instruction can be further configured to run on the one or more processing modules and perform an act of allowing a transaction to proceed if the age of the customer satisfies the age-restriction for the item.

Further embodiments include at least one non-transitory memory storage module having computer instructions stored thereon executable by one or more processing modules to receive a transmission indicating an intention by a customer to purchase an item via a mobile device. Receive the transmission indicating the intention by the customer to purchase the item via the mobile device can comprise receive the transmission that the customer has scanned, with the mobile device, a unique identifier of the item to be purchased, coordinate a first display of item information on the mobile device of the customer, receive a purchase confirmation from the mobile device of the customer, coordinate a second display of one or more item suggestions on the mobile device of the customer, and receive a check-out process initiation from the mobile device of the customer. The computer instructions also can executable by one or more processing modules to determine if the item is subject to an age-restriction. The computer instructions also can executable by one or more processing modules to receive biometric data from the customer. The computer instructions also can executable by one or more processing modules to confirm an identity of the customer by comparing the biometric data received from the customer with verified biometric data of the customer. The computer instructions also can executable by one or more processing modules to determine an age of the customer. The computer instructions also can executable by one or more processing modules to allow a transaction to proceed if the age of the customer satisfies the age-restriction for the item.

Figure 2:
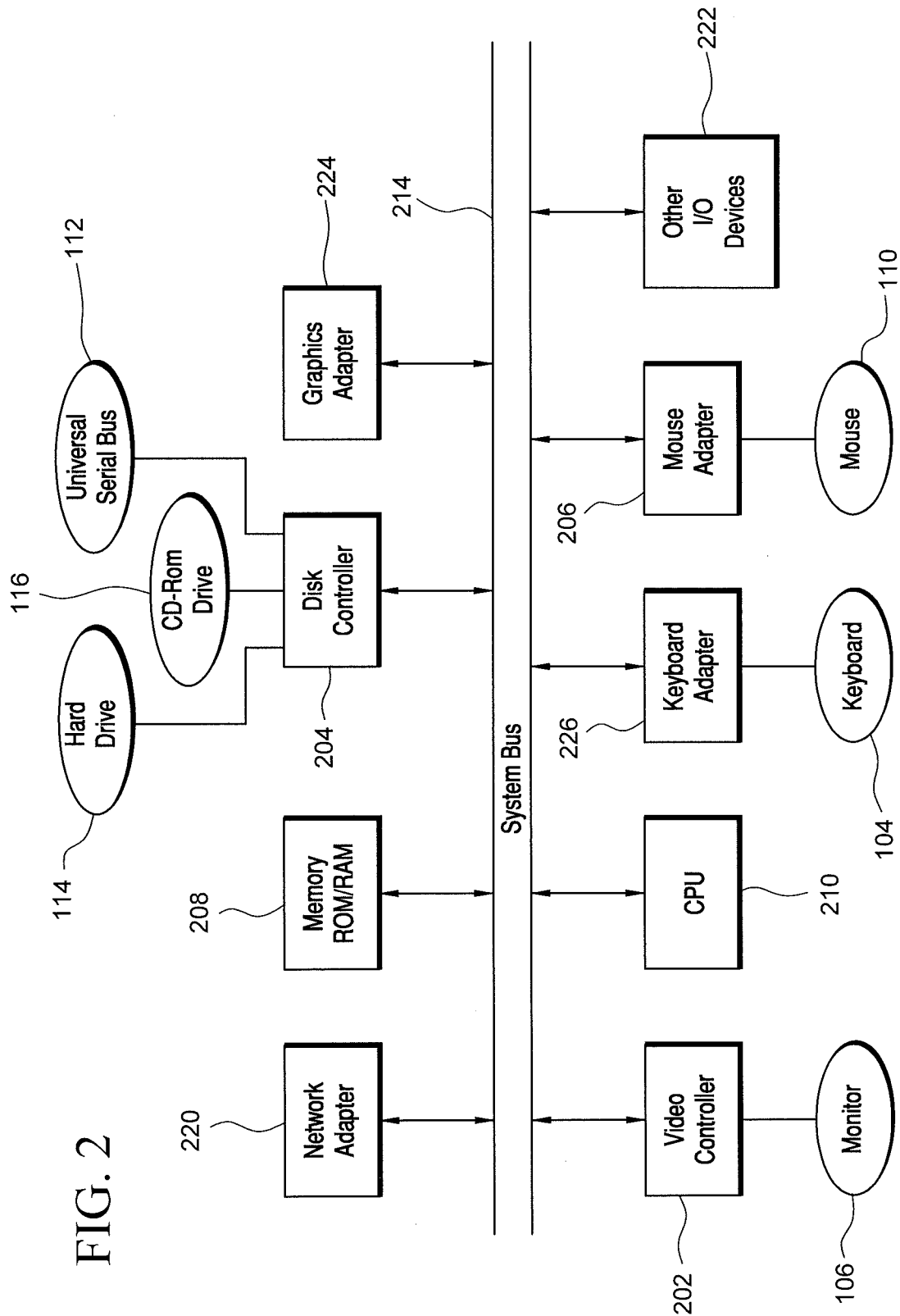
FIG. 2 illustrates a representative block diagram of exemplary elements included on the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-transitory (e.g., non-volatile) memory, such as, for example, read only memory (ROM) and/or (ii) transitory (e.g., volatile) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), hard drive 114 (FIGS. 1-2), CD-ROM and/or DVD drive 116 (FIGS. 1-2), a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
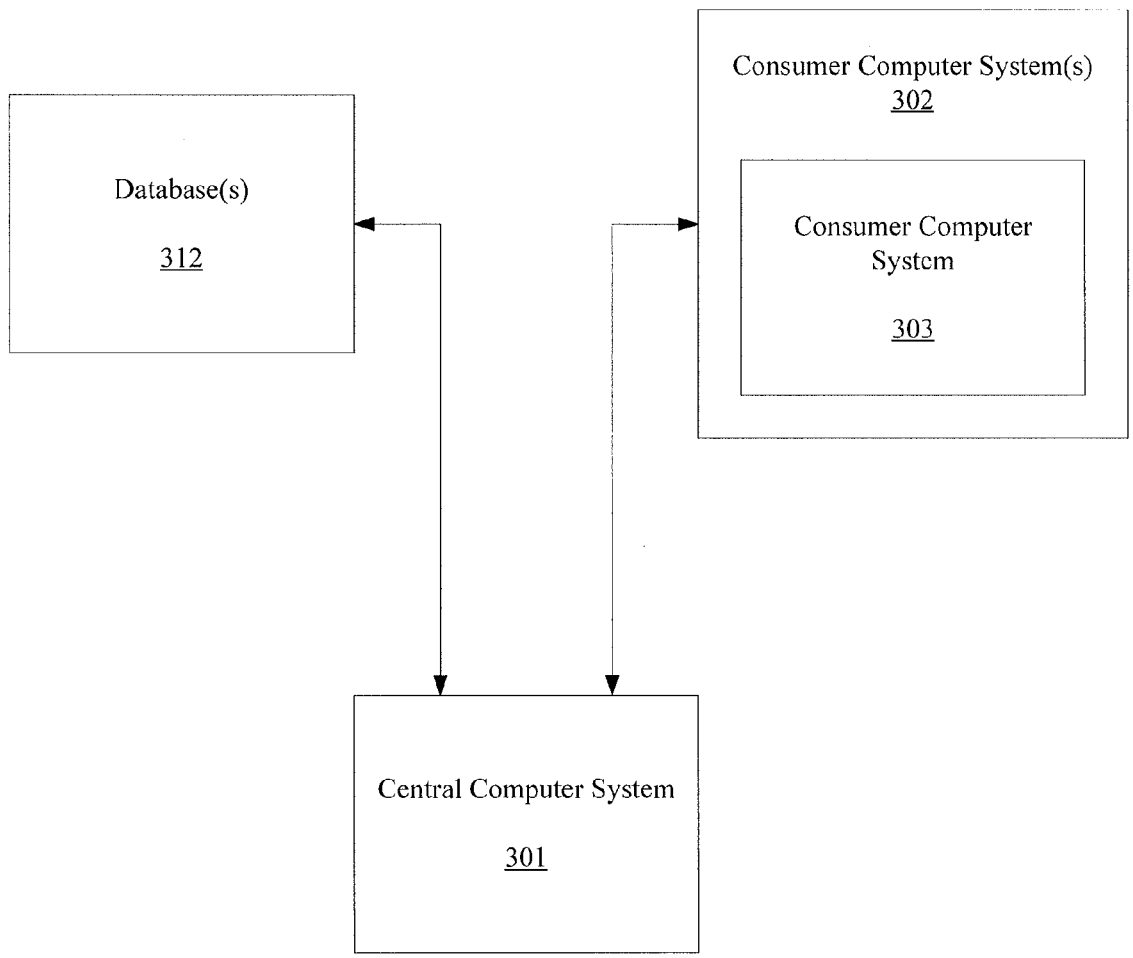
FIG. 3 illustrates a representative block diagram of a system, according to an embodiment.

Skipping ahead now in the drawings, FIG. 3 illustrates a representative block diagram of a system 300, according to an embodiment. System 300 is merely exemplary and embodiments of the system are not limited to the embodiments presented herein. System 300 can be employed in many different embodiments or examples not specifically depicted or described herein. In some embodiments, certain elements or modules of system 300 can perform various methods and/or activities of those methods. In these or other embodiments, the methods and/or the activities of the methods can be performed by other suitable elements or modules of system 300.

As further described in greater detail below, in these or other embodiments, system 300 can proactively (e.g., prospectively) and/or reactively (e.g., responsively) determine and/or communicate the consumer product information to the consumer, as desired. Proactive acts can refer to acts (e.g., identification, determination, communication, etc.) performed without consideration of one or more acts performed by the consumer, and reactive acts can refer to acts (e.g., identification, determination, communication, etc.) performed with consideration of (i.e., in response to) one or more acts performed by the consumer. For example, in some embodiments, the act(s) can comprise an act of identifying a selection of a consumer product by the consumer.

Meanwhile, as also described in greater detail below, system 300 can be implemented in brick-and-mortar commerce and/or electronic commerce applications, as desirable. Further, in many of these or other embodiments, system 300 can communicate the consumer product information to the consumer substantially in real-time (e.g., near real-time). Near real-time can mean real-time less a time delay for processing (e.g., determining) and/or transmitting the relevant consumer product information to the relevant consumer. The particular time delay can vary depending on the type and/or amount of the consumer product information, the processing speed(s) of the processing module(s) of system 300, the transmission capability of the communication hardware (as introduced below), the transmission distance, etc. However, in many embodiments, the time delay can be less than approximately one, five, ten, or twenty minutes.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Specifically, system 300 comprises a central computer system 301. In many embodiments, central computer system 301 can be similar or identical to computer system 100 (FIG. 1). Accordingly, central computer system 301 can comprise one or more processing modules and one or more memory storage modules (e.g., one or more non-transitory memory storage modules). In these or other embodiments, the processing module(s) and/or the memory storage module(s) can be similar or identical to the processing module(s) and/or memory storage module(s) (e.g., non-transitory memory storage modules) described above with respect to computer system 100 (FIG. 1). In some embodiments, central computer system 301 can comprise a single computer or server, but in many embodiments, central computer system 301 comprises a cluster or collection of computers or servers and/or a cloud of computers or servers. Meanwhile, central computer system 301 can comprise one or more input devices (e.g., one or more keyboards, one or more keypads, one or more pointing devices such as a computer mouse or computer mice, one or more touchscreen displays, etc.), and/or can comprise one or more display devices (e.g., one or more monitors, one or more touch screen displays, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of central computer system 301 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of central computer system 301. In a similar manner, the processing module(s) and the memory storage module(s) can be local and/or remote to each other.

In many embodiments, central computer system 301 is configured to communicate with one or more consumer computer systems 302 (e.g., a consumer computer system 303) of one or more consumers. For example, the consumer(s) can interface (e.g., interact) with central computer system 301, and vice versa, via consumer computer system(s) 302 (e.g., consumer computer system 303). Accordingly, in many embodiments, central computer system 301 can refer to a back end of system 300 operated by an operator and/or administrator of system 300, and consumer computer system(s) 302 can refer to a front end of system 300 used by one or more users of system 300 (i.e., the consumer(s)). In these or other embodiments, the operator and/or administrator of system 300 can manage central computer system 301, the processing module(s) of computer system 301, and/or the memory storage module(s) of computer system 301 using the input device(s) and/or display device(s) of central computer system 301. In some embodiments, system 300 can comprise consumer computer system(s) 302 (e.g., consumer computer system 303).

Like central computer system 301, consumer computer system(s) 302 each can be similar or identical to computer system 100 (FIG. 1), and in many embodiments, each of consumer computer system(s) 302 can be similar or identical to each other. In many embodiments, consumer computer system(s) 302 can comprise one or more desktop computer devices, one or more wearable user computer devices, and/or one or more mobile devices, etc. At least part of central computer system 301 can be located remotely from consumer computer system(s) 302.

In some embodiments, a mobile device can refer to a portable electronic device (e.g., an electronic device easily conveyable by hand by a person of average size) with the capability to present audio and/or visual data (e.g., images, videos, music, etc.). For example, a mobile device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can comprise a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile device, and vice versa. However, a wearable user computer device does not necessarily comprise a mobile device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ or a similar product by Google Inc. of Menlo Park, Calif., United States of America; (ii) the Eye Tap™, the Laser Eye Tap™, or a similar product by ePI Lab of Toronto, Ontario, Canada, and/or (iii) the Raptyr™, the STAR 1200™, the Vuzix Smart Glasses M100™, or a similar product by Vuzix Corporation of Rochester, N.Y., United States of America. In other specific examples, a head mountable wearable user computer device can comprise the Virtual Retinal Display™, or similar product by the University of Washington of Seattle, Wash., United States of America. Meanwhile, in further specific examples, a limb mountable wearable user computer device can comprise the iWatch™, or similar product by Apple Inc. of Cupertino, Calif., United States of America, the Galaxy Gear or similar product of Samsung Group of Samsung Town, Seoul, South Korea, the Moto 360 or similar product of Motorola of Schaumburg, Ill., United States of America, and/or the Zip™, One™, Flex™, Charge™, Surge™, or similar product by Fitbit Inc. of San Francisco, Calif., United States of America.

In further embodiments, central computer system 301 can be configured to communicate with software (e.g., one or more web browsers, one or more mobile software applications, etc.) of the consumer computer system(s) 302 (e.g., consumer computer system 303). For example, the software can run on one or more processing modules and can be stored on one or more memory storage modules (e.g., one or more non-transitory memory storage modules) of the consumer computer system(s) 302 (e.g., consumer computer system 303). In these or other embodiments, the processing module(s) of the consumer computer system(s) 302 (e.g., consumer computer system 303) can be similar or identical to the processing module(s) described above with respect to computer system 100 (FIG. 1). Further, the memory storage module(s) (e.g., non-transitory memory storage modules) of the consumer computer system(s) 302 (e.g., consumer computer system 303) can be similar or identical to the memory storage module(s) (e.g., non-transitory memory storage module(s)) described above with respect to computer system 100 (FIG. 1). Exemplary web browsers can include (i) Firefox® by the Mozilla Organization of Mountain View, Calif., United States of America, (ii) Internet Explorer® by the Microsoft Corp. of Redmond, Wash., United States of America, (iii) Chrome™ by Google Inc. of Menlo Park, Calif., United States of America, (iv) Opera® by Opera Software of Oslo, Norway, and (v) Safari® by Apple Inc. of Cupertino, Calif., United States of America.

Meanwhile, in many embodiments, central computer system 301 also can be configured to communicate with one or more databases 312. The database can comprise a product database that contains information about products sold by a retailer. Database(s) 312 can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of database(s) 312, that particular database can be stored on a single memory storage module of the memory storage module(s) and/or the non-transitory memory storage module(s) storing database(s) 312 or it can be spread across multiple of the memory storage module(s) and/or non-transitory memory storage module(s) storing database(s) 312, depending on the size of the particular database and/or the storage capacity of the memory storage module(s) and/or non-transitory memory storage module(s).

In these or other embodiments, the memory storage module(s) of central computer system 300 can comprise some or all of the memory storage module(s) storing database(s) 312. In further embodiments, some of the memory storage module(s) storing database(s) 312 can be part of consumer computer systems 302 and/or one or more third-party computer systems (i.e., other than central computer system 301 and consumer computer systems 302), and in still further embodiments, all of the memory storage module(s) storing database(s) 312 can be part of consumer computer systems 302 and/or the third-party computer system(s). Like central computer system 301 and consumer computer system(s) 302, when applicable, each of the third-party computer system(s) can be similar or identical to computer system 100 (FIG. 1). Notably, the third-party computer systems are omitted from the drawings to better illustrate that database(s) 312 can be stored at memory storage module(s) of central computer system 301, consumer computer system(s) 302, and/or the third-party computer systems, depending on the manner in which system 300 is implemented.

Database(s) 312 each can comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between central computer system 301, consumer computer system(s) 302 (e.g., consumer computer system 303), and/or database(s) 312 can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.)

For convenience, the functionality of system 300 is described herein as it relates particularly to consumer computer system 303 and a single consumer, but in many embodiments, the functionality of system 300 can be extended to each of consumer computer system(s) 302 and/or to multiple consumers. In these extended examples, in some embodiments, single consumers can interface (e.g., interact) with central computer system 301 with multiple consumer computer systems of consumer computer system(s) 302 (e.g., at different times). For example, a consumer could interface with central computer system 301 via a first consumer computer system (e.g., a desktop computer), such as, for example, when interfacing with central computer system 301 from home, and via a second consumer computer system (e.g., a mobile device), such as, for example, when interfacing with central computer system 301 away from home.

In many types of retail businesses, the retail business uses a checkout model for purchases. A consumer chooses one or more items that he/she wishes to purchase. The consumer then presents the one or more items to an employee of the retail business. The employee proceeds to determine the total cost of the items, receives payment from the consumer, then provides the items to the consumer.

There are various alternative arrangements for allowing a consumer to purchase items from a brick and mortar retail business. For example, there is the "self-checkout" model. In the self-checkout model, after a consumer selects the goods he wishes to purchase, the consumer scans items for purchases. Generally, there are one or more self-checkout stands in one area of the brick and mortar retail business. Thus, one employee can monitor the check-out of multiple consumers at the same time, instead of needing one employee for each line of consumers.

A novel method of allowing consumers to shop is a technology that some retailers call scan and go. Briefly, in a scan and go methodology, a consumer uses a mobile device to indicate his purchases as he travels through a retailer. When he wants to leave the retailer, he performs a checkout. To more thoroughly describe this process, refer to FIG. 4.

Figure 4:
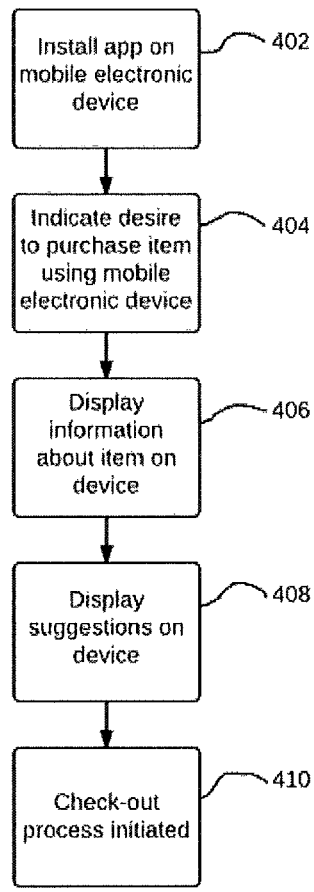
FIG. 4 is a flowchart illustrating a method of a scan and go methodology according to an embodiment.

A flowchart illustrating the operation of a scan and go methodology 400 is presented in FIG. 4. Method 400 is merely exemplary and is not limited to the embodiments presented herein. Method 400 can be employed in many different embodiments or examples not specifically depicted or described herein. In some embodiments, the procedures, the processes and/or the activities of method 400 can be performed in the order presented. In other embodiments, the procedures, the processes, and/or the activities of method 400 can be performed in any other suitable order. In still other embodiments, one or more of the procedures, the processes, and/or the activities of method 400 can be combined or skipped. In some embodiments, portions of method 400 can be implemented by computer system 100 (FIG. 1).

A consumer installs an app on a mobile device (block 402). Referring back to FIG. 3, the mobile device can be one of consumer computer system(s) 302. As described above, a variety of different mobile devices can be used. A smartphone would be the most common type of portable electronic device that would be used in such a scenario. Other mobile devices such as phablets, tablets, portable music players, special-purpose scanning devices, wearable electronic devices, and other electronic devices that have internet connectivity also can be used. In some embodiments, instead of a consumer installing an app on his mobile device, a consumer can use a special-purpose electronic device provided by the retailer.

Returning to FIG. 4, the consumer then travels through a retailer's store to find items he wishes to purchase. When he finds an item he wishes to purchase, he uses the mobile device to indicate the desire to purchase the item (block 404). This indication can be accomplished in one of a variety of different manners.

For example, as described above, there can be an application (also known as an "app") in a mobile device that can provide a consumer with the ability to scan items to be purchased. The app would use a camera of the mobile device to scan or to take a photograph of the universal product code (UPC), international standard book number (ISBN), or other unique identifier of the product that the consumer wishes to purchase. With reference to FIG. 3, the mobile device (e.g., consumer computer system 303) can be in communication with central computer system 301. Central computer system 301 is in communication with one or more databases 312. Among databases 312, there can be a product database containing information about each product sold by the retailer.

Returning to FIG. 3, the app then searches a database (such as a product database) to find the product and displays information about the product on the mobile device (block 406). The user can be provided with an opportunity to confirm the purchase. In some embodiments, the app also can provide suggestions to the consumer (block 408). For example, the app can inform the consumer that a different size of the product is on sale. The app can suggest products that are often purchased with the chosen product (e.g., suggesting fabric softener when a consumer chooses a laundry detergent). Many other features also can be present.

After the consumer finishes shopping, the consumer approaches a checkout area of the retailer. However, because the consumer already scanned each of the items he wishes to purchase using the mobile device, in some embodiments he does not need to scan the items again. Instead, in such embodiments, the consumer needs only to pay for the items. The consumer begins the checkout process (block 410). This can involve using the mobile device to enter payment information. In some embodiments, the consumer has the capability to provide and store payment information into the mobile device. For example, the consumer can store credit card information (such as an account number, an expiration date, and a card security code) in the mobile device. In that type of situation, the consumer can indicate his desire to apply the previously entered payment information to the purchase. The consumer also can pay for the selected goods using cash or a check through a terminal at the retailer. The consumer will typically place the purchase products in plastic bags, paper bags, reusable bags, boxes, and the like for ease in transporting the goods.

In some uses, a consumer would be able to select goods and pay for the goods without any interaction with employees of the retailer. While such a feature can make the shopping experience faster for the consumer, there are some items that are age-restricted in that people below a certain age are prevented from buying certain items. For example, in the United States of America, the typical age-restriction for buying tobacco products is 18-years old, though some states restrict purchase to people 19-years old and older. The typical age-restriction for the purchase of alcoholic beverages in the United States is 21-years old. Other items that may have age-restrictions include (but are not limited to) movies, video games, and firearms.

When a purchase of such an age-restricted product is made through an employee of a retail store, the employee will typically request that the customer provide proof of his age, such as through the use of a government-issued identification (e.g., a driver's license). The employee will then examine the government-issued identification to ensure that the consumer is of the correct age to purchase the product in question.

When a retailer uses a system such as the method described with respect to FIG. 4, there might not be an employee of the retailer who examines the purchases of each customer. The customer scans the items in his transaction using a mobile device, can pay for the items using the mobile device or self-checkout terminal, and can bag his items, all without interacting with an employee of the retailer. In order to purchase age-restricted items, the customer might be asked to provide proof of age to an employee of the retailer. However, such a process can become time-consuming, as lines can form, thus reducing the speed effectiveness of such a scan and go methodology. In order to speed-up the process of performing an age check on age-restricted items, a new methodology might be used.

Figure 5:
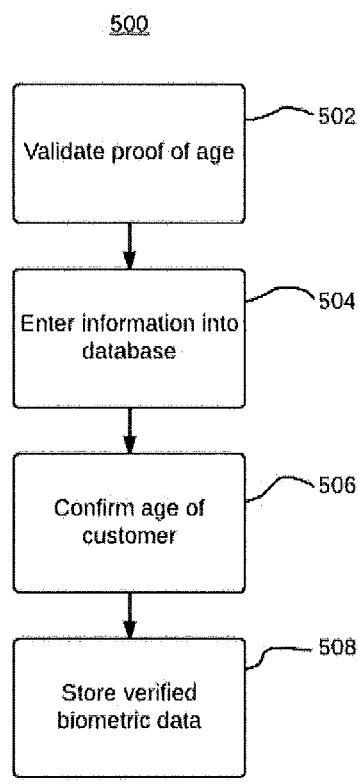
FIG. 5 is a flowchart illustrating a method of operation of an age-restriction registration methodology according to an embodiment.

A flowchart illustrating the operation of an age-restriction registration methodology 500 is presented in FIG. 5. Method 500 is merely exemplary and is not limited to the embodiments presented herein. Method 500 can be employed in many different embodiments or examples not specifically depicted or described herein. In some embodiments, the procedures, the processes and/or the activities of method 500 can be performed in the order presented. In other embodiments, the procedures, the processes, and/or the activities of method 500 can be performed in any other suitable order. In still other embodiments, one or more of the procedures, the processes, and/or the activities of method 500 can be combined or skipped. In some embodiments, portions of method 500 can be implemented by computer system 100 (FIG. 1).

As described above, a scan and go methodology can enable a customer to use a mobile device to scan purchases and/or make payments. An age-verification methodology also can be implemented in such a process. A customer can register to use a scan and go methodology at a retail location if the customer is interested in being able to purchase age-restricted items using a scan and go methodology. As part of the registration process, the customer can provide proof of age by providing a government-issued identification or other proof of age to a representative of the retailer. The proof of age is validated by the representative (block 502). In some embodiments, the validation can take place manually, by having the representative examine the identification and comparing the identification to known valid exemplars. In some embodiments, the validation can be performed by a computerized system performing an embodiment. In such a case, the identification can be scanned using one of a variety of different methods. In some embodiments, the front and/or back of an identification can be scanned to create an image of the identification. Thereafter, the scanned identification is examined to confirm the authenticity of the identification. The presence and placement of features for that type of identification (e.g., the location of the photo, the date of birth, and a signature) can be compared to the expected presence and placement of features. In other embodiments, an identification can have bar code, a magnetic stripe, or a radio-frequency identification (RFID) that can be scanned using the appropriate technology.

A remote database can be contacted to confirm the authenticity of the identification. For example, the data on the identification can be compared to data stored in a government database. In other embodiments, the expected appearance of an official identification (e.g., the correct location of photograph, typeface, size and placement, ink color, color densities, hologram, and other security/authenticity features, etc.) can be compared to the identification provided by the customer.

Once the representative of the retailer has confirmed the validity of the identification or other proof of age, the date of birth and other relevant information can be entered in a database (block 504). In some embodiments, a representative can enter this information into a database. In some embodiments, the information is automatically retrieved from the scan of the identification. An embodiment can confirm that the customer meets the age requirements of purchasing age-restricted items and such information is stored in a database such as one of database 312 (block 506). If the customer meets one age-restriction but not another (e.g., the customer is 20-years old and is thus able to buy tobacco products in a certain jurisdiction, but not legally allowed to purchase alcoholic beverages), an indication of such is placed in the database. In some embodiments, the age of the customer can be calculated each time the customer tries to make a purchase. Thus, even if a customer did not meet the age requirements at the time of an initial registration, the customer can be allowed to make age-restricted purchases at a later time, when the user does meet the age requirements (e.g., after the customer celebrates his $21^{st}$ birthday.) In some embodiments, a copy of the proof of age also can be stored in the database.

Unique biometric data belonging to the customer can be stored as verified biometric data in the database when an age-verification registration is performed (block 508). As described above, examples of such biometric data can include, but is not limited to, a retinal scan, a fingerprint scan, hand-print scan, facial recognition, and voice identification (also known as voice biometrics or speaker recognition). Biometric data can be a good method of performing such an identification because the scan is unique to each person and is easily produced by the customer (unlike a PIN or password, biometric data is extremely difficult to lose or be stolen and is always carried by the customer.)

In use, when a customer confirms his age by registering an account and providing a proof of age, the customer also can provide biometric data to the person conducting the registration. The biometric data can be gathered through the use of a biometric sensing device. In some embodiments, a photograph of the customer can be taken and stored in a database. In some embodiments, a voice sample of the customer can be taken and stored in a database. In some embodiments, a fingerprint scanner can be used to scan the customer's fingerprints and store the results in a database. In some embodiments, a handprint scanner can be used to scan the customer's fingerprints and store the results in a database. In some embodiments, a retinal scanner can be used to scan the customer's fingerprints and store the results in a database. Other forms of biometrics also can be used. In some embodiments, multiple pieces of biometric data can be stored for each customer. In some embodiments, the biometric sensing device can be located at the premises of the retailer. In some embodiments, the biometric sensing device can be coupled to a mobile device. Coupled to a mobile device can include being integral with a mobile device, such as a fingerprint scanner, a camera and/or microphone built-in to a smartphone.

After the customer has registered by providing proof of age, it can be desirable to verify the customer's identification when the customer is making a purchase (e.g., to prevent an under-aged person from using an age-verified account belonging to someone else). To perform such a verification, the customer's identification can be verified in one of a variety of different manners.

Figure 6:
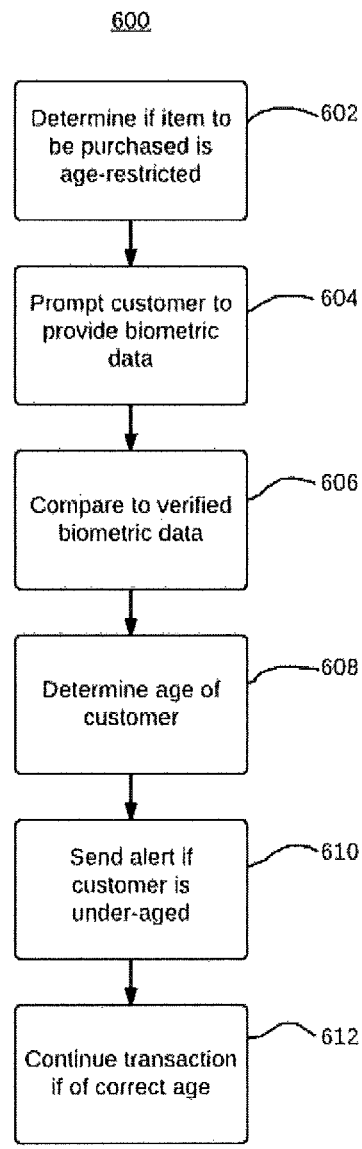
FIG. 6 is a flow chart illustrating the operation of an age-restriction checking methodology according to an embodiment.

A flowchart illustrating the operation of an age-restriction checking methodology 600 is presented in FIG. 6. Method 600 is merely exemplary and is not limited to the embodiments presented herein. Method 600 can be employed in many different embodiments or examples not specifically depicted or described herein. In some embodiments, the procedures, the processes and/or the activities of method 600 can be performed in the order presented. In other embodiments, the procedures, the processes, and/or the activities of method 600 can be performed in any other suitable order. In still other embodiments, one or more of the procedures, the processes, and/or the activities of method 600 can be combined or skipped. In some embodiments, portions of method 600 can be implemented by computer system 100 (FIG. 1).

When making a purchase using a scan and go type of methodology, the items purchased by the consumer are examined to determine if there is an age-restriction on the item (block 602). In some embodiments, a database containing information about each item will also have a field that indicates if the item has an age-restriction. In some embodiments, the category of the item can be determined. Thereafter, it can be determined if the category is subject to an age-restriction. If there is an age-restriction on the item, the user can be prompted to provide biometric data to confirm that the person making the purchase of an age-restricted item is allowed to purchase the item (block 604). In some embodiments, the biometric data can be provided by the customer using a biometric sensing device located at a terminal at the retailer. In some embodiments, the biometric sensing device can be coupled or built-in to a mobile device (e.g., several smartphones have built-in fingerprint sensors, cameras for use with facial recognition, and microphones for use with speaker recognition). In some embodiments, the prompt to provide biometric data can occur when the user scans the item. In some embodiments, the prompt to provide biometric data can occur during a checkout procedure.

Biometric data can include any form of biometric data now known or developed in the future. Exemplary biometric data that can be provided by a customer include fingerprints, hand prints, facial recognition, retinal scans, vocal biometrics, and the like.

Once the customer provided biometric data to his smartphone or a POS terminal, the biometric data can be sent to a central computer system. The central computer system (such as central computer system 301 of FIG. 3) can be configured to compare the biometric data to the verified biometric data that was stored when the customer created his account (block 606). If the comparison confirms the biometric data, the age of the customer can be determined (block 608). This determination can be determined by determining the date of the attempted transaction and calculating the age of the customer as of the date. The date of the transaction can be determined in a variety of ways known in the art. In some embodiments, the date and time of the transaction can be calculated using global positioning system (GPS) data. GPS data can include, not only location information, but also time information. Thus, the exact time of the transaction can be determined, and the customer's age can be determined at that time (for example, a transaction just after midnight on the customer's $21^{st}$ birthday can be allowed). The time and date of the transaction also can be determined by other methods, including but not limited to, a network time protocol (NTP) system and a code division multiple access (CDMA) time sync system.

The location of the transaction also can be used to determine if the transaction should be allowed to proceed. As described above, GPS can be used to determine the time of the transaction. GPS also can be used to determine the time and/or location of the transaction. The GPS information can be provided by the mobile device (for example, many smartphones have GPS capabilities). The GPS information also can be provided by a POS terminal located at the retailer's location, which can be configured with a GPS chip. In an alternative, a GPS coordinates of each retailer can be stored in a database. When a customer attempts a checkout at a specific location of the retailer, the GPS coordinates of the retailer can be retrieved from the database.

As discussed above, some US states have an age restriction of 19-years of age to purchase tobacco products while other states have an age restriction of 18 years of age. Other jurisdictions can have other age-restrictions. For example, while one must be at least 21-years old to purchase alcohol in the United States, in Mexico and in some provinces of Canada, the age requirement is 18-years old, and in other provinces of Canada, the age requirement is 19-years old. These location-based age restrictions can be taken into account when determining if the customer meets the age-restrictions.

If the comparison does not confirm the biometric data with the verified biometric data, the transaction can be forced to stop. An alert can be sent to the customer's mobile device that the transaction is not allowed. An alert also can be sent to an employee of the retailer (such as an auditor, greeter, or security personnel) notifying the employee that someone is attempting to purchase an age-restricted item (block 610). The customer can then confirm his identity to an employee of the retailer or can continue the transaction without the age-restricted item. If the comparison does confirm the verified biometric data, the transaction is approved and allowed to proceed (612). In such a manner, the customer is able to conduct the entire transaction without requiring an interaction with an employee of the retailer.

Figure 7:
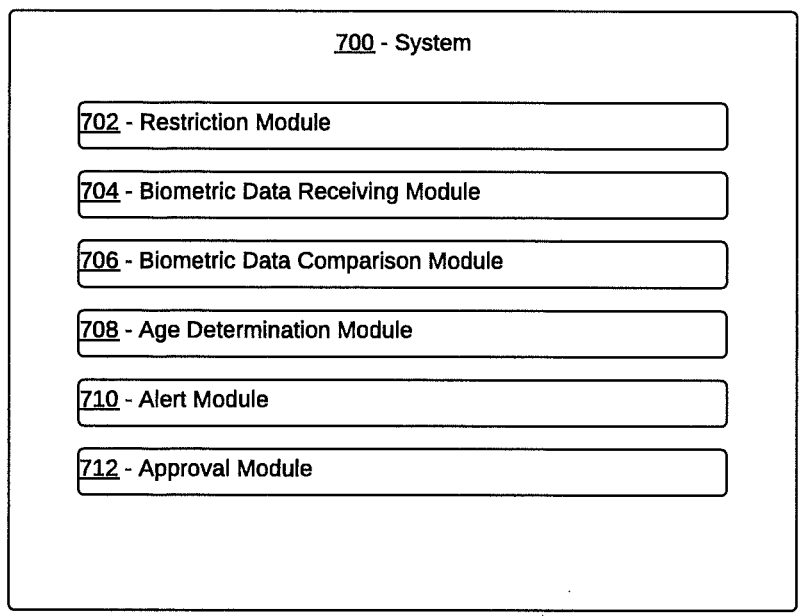
FIG. 7 is a block diagram illustrating a system capable of performing an embodiment.

Turning ahead in the figures, FIG. 7 illustrates a block diagram of a system 700 that is capable of performing disclosed embodiments. System 700 is merely exemplary and is not limited to the embodiments presented herein. System 700 can be employed in many different embodiments or examples not specifically depicted or described herein. In some embodiments, certain elements or modules of system 700 can perform various procedures, processes, and/or acts. In other embodiments, the procedures, processes, and/or acts can be performed by other suitable elements or modules.

In a number of embodiments, system 700 can include restriction module 702. In certain embodiments, receiving module 702 can perform block 602 (FIG. 6) of examining items in a transaction to determine if the item In a number of embodiments, system 700 can include biometric data receiving module 704. In certain embodiments, biometric data receiving module 704 can perform block 604 (FIG. 6) of receiving biometric data from a customer.

System 700 can include biometric data comparison module 706. In certain embodiments, biometric data comparison module 706 can perform block 606 (FIG. 6) of comparing biometric data with verified biometric data.

System 700 can include age determination module 708. In certain embodiments, age determination module 708 can perform block 608 (FIG. 6) of determining the age of the customer.

System 700 can include alert module 710. In certain embodiments, alert module 710 can perform block 610 (FIG. 6) of sending an alert if the age of the customer does not satisfy an age restriction. estimating a number of bags used by the consumer for the present purchase.

System 700 can include approval module 712. In certain embodiments, approval module 712 can perform block 612 of approving the transaction and allowing the transaction to proceed.

Although the above embodiments have been described with reference to specific embodiments, it will be understood by those skilled in the art that various changes can be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-7 can be modified, and that the foregoing discussion of certain of these embodiments does not necessarily represent a complete description of all possible embodiments. For example, one or more of the procedures, processes, or activities of FIGS. 1-7 can include different procedures, processes, and/or activities and be performed by many different modules, in many different orders.

Replacement of one or more claimed elements constitutes reconstruction and not repair. Additionally, benefits, other advantages, and solutions to problems have been described with regard to specific embodiments. The benefits, advantages, solutions to problems, and any element or elements that can cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method comprising:
    receiving a transmission indicating an intention by a customer to purchase an item via a mobile device, wherein receiving the transmission comprises:
        receiving the transmission that the customer has scanned, with the mobile device, a unique identifier of the item to be purchased;
        coordinating a first display of item information for the item on the mobile device of the customer;
        receiving a purchase confirmation of the item from the mobile device of the customer;
        coordinating a second display of one or more item suggestions on the mobile device of the customer; and
        receiving a check-out process initiation for the item from the mobile device of the customer;

determining if the item is subject to an age-restriction; and
if the item is subject to the age-restriction:
confirming an identity of the customer;
determining an age of the customer after confirming the identity of the customer; and
allowing the customer to purchase the item if the age of the customer satisfies the age-restriction for the item.

2. The method of claim 1, wherein:
the method further comprises, if the item is subject to the age-restriction, receiving biometric data from the customer by:
using the mobile device to prompt the customer to submit the biometric data; and
receiving the biometric data from a biometric sensing device; and
confirming the identity of the customer comprises confirming the identity of the customer by comparing the biometric data received from the customer with verified biometric data of the customer.

3. The method of claim 2, wherein the biometric sensing device comprises a terminal located at a retailer.

4. The method of claim 2, wherein:
the biometric sensing device is coupled to the mobile device; and
no interaction with an employee of a retailer is required.

5. The method of claim 2, wherein the biometric data comprises at least one of a fingerprint, a hand print, a facial recognition, a retinal scan, or vocal biometrics.

6. The method of claim 2, wherein:
receiving the biometric data from the customer comprises receiving original biometric data from the customer; and
the method further comprises:
storing proof of age information regarding the customer in a database, wherein the proof of age information comprises a date of birth of the customer retrieved from a government-issued identification of the customer;
storing the original biometric data as the verified biometric data in the database with the proof of age information; and
validating the proof of age information.

7. The method of claim 1, wherein:
determining if the item is subject to the age-restriction comprises:
determining a category of the item; and
determining the age-restriction for the category using a location of the transmission.

8. The method of claim 1, further comprising sending an alert if the customer does not meet the age-restriction for the item.

9. The method of claim 1, wherein determining the age of the customer comprises determining the age of the customer by:
retrieving a current date at the mobile device by accessing a time server to determine the current date at the mobile device, wherein the time server is chosen from: a global positioning system (GPS), a network time protocol (NTP) system, or a code division multiple access (CDMA) system; and
subtracting the current date from a date of birth of the customer.

10. The method of claim 1, wherein:
the method further comprises receiving biometric data from the customer by:
using the mobile device to prompt the customer to submit the biometric data; and
receiving the biometric data from a biometric sensing device;
confirming the identity of the customer comprises confirming the identity of the customer by comparing the biometric data received from the customer with verified biometric data of the customer;
the biometric sensing device is (1) a terminal located at a retailer, or (2) coupled to the mobile device, wherein no interaction with an employee of the retailer is required;
the biometric data comprises at least one of a fingerprint, a hand print, a facial recognition, a retinal scan, or vocal biometrics;
determining if the item is subject to the age-restriction comprises:
determining a category of the item; and
determining the age-restriction for the category using a location of the transmission;
receiving the biometric data from the customer comprises receiving original biometric data from the customer;
determining the age of the customer comprises determining the age of the customer by:
retrieving a current date at the mobile device by accessing a time server to determine the current date at the mobile device, wherein the time server is chosen from: a global positioning system (GPS), a network time protocol (NTP) system, or a code division multiple access (CDMA) system; and
subtracting the current date from a date of birth of the customer; and
the method further comprises:
storing proof of age information regarding the customer in a database, the proof of age information comprising the date of birth of the customer retrieved from a government-issued identification of the customer;
storing the original biometric data as the verified biometric data in the database with the proof of age information;
validating the proof of age information; and
sending an alert if the customer does not meet the age-restriction for the item.

11. A system comprising:
one or more processing modules; and
one or more non-transitory storage modules storing computing instructions configured to run on the one or more processing modules and perform acts of:
receiving a transmission indicating an intention for a customer to purchase an item from a retailer via a mobile device, wherein receiving the transmission comprises:
receiving the transmission that the customer has scanned, with the mobile device, a unique identifier of the item to be purchased;
coordinating a first display of item information for the item on the mobile device of the customer;
receiving a purchase confirmation of the item from the mobile device of the customer;
coordinating a second display of one or more item suggestions on the mobile device of the customer; and
receiving a check-out process initiation for the item from the mobile device of the customer;
determining if the item is subject to an age-restriction; and
if the item is subject to the age-restriction:
confirming an identity of the customer;
determining an age of the customer after confirming the identity of the customer; and allowing the customer to purchase the item if the age of the customer satisfies the age-restriction for the item.

12. The system of claim 11, wherein:
the one or more non-transitory storage modules storing the computing instructions are further configured to run on the one or more processing modules and perform an act of receiving biometric data from the customer by:
using the mobile device to prompt the customer to submit the biometric data; and
receiving the biometric data from a biometric sensing device; and
confirming the identity of the customer comprises confirming the identity of the customer by comparing the biometric data received from the customer with verified biometric data of the customer.

13. The system of claim 12, wherein the biometric sensing device comprises a terminal located at the retailer.

14. The system of claim 12, wherein the biometric sensing device is coupled to the mobile device.

15. The system of claim 12, wherein the biometric data comprises at least one of a fingerprint, a hand print, a facial recognition, a retinal scan, or vocal biometrics.

16. The system of claim 12, wherein:
receiving the biometric data from the customer comprises receiving original biometric data from the customer; and
the one or more non-transitory storage modules storing the computing instructions are configured to run on the one or more processing modules and perform further acts of:
storing proof of age information regarding the customer in a database, wherein the proof of age information comprises a date of birth of the customer retrieved from a government-issued identification of the customer;
storing the original biometric data as the verified biometric data in the database with the proof of age information; and
validating the proof of age information.

17. The system of claim 11, wherein:
determining if the item is subject to the age-restriction comprises:
determining a category of the item; and
determining the age-restriction for the category using a location of the transmission.

18. The system of claim 11, wherein determining the age of the customer comprises determining the age of the customer by:
retrieving a current date at the mobile device by accessing a time server to determine the current date at the mobile device, wherein the time server is chosen from a global positioning system (GPS), a network time protocol (NTP) system, and a code division multiple access (CDMA) system; and
subtracting the current date from a date of birth of the customer.

19. The system of claim 11, wherein:
the one or more non-transitory storage modules storing the computing instructions are further configured to run on the one or more processing modules and perform an act of receiving biometric data from the customer by:
using the mobile device to prompt the customer to submit the biometric data; and
receiving the biometric data from a biometric sensing device; and
confirming the identity of the customer comprises confirming the identity of the customer by comparing the biometric data received from the customer with verified biometric data of the customer;
the biometric sensing device is (1) a terminal located at the retailer, or (2) coupled to the mobile device;
the biometric data comprises at least one of a fingerprint, a hand print, a facial recognition, a retinal scan, or vocal biometrics;
the proof of age information comprises a date of birth of the customer retrieved from a government-issued identification of the customer;
storing the proof of age information further comprises validating the proof of age information;
receiving the biometric data from the customer comprises receiving original biometric data from the customer;
determining if the item is subject to the age-restriction comprises:
determining a category of the item; and
determining the age-restriction for the category using a location of the transmission;
determining the age of the customer comprises determining the age of the customer by:
retrieving a current date at the mobile device by accessing a time server to determine the current date at the mobile device, wherein the time server is chosen from a global positioning system (GPS), a network time protocol (NTP) system, and a code division multiple access (CDMA) system; and
subtracting the current date from the date of birth of the customer; and
the one or more non-transitory storage modules storing the computing instructions are configured to run on the one or more processing modules and perform further acts of:
storing proof of age information regarding the customer in a database; and
storing the original biometric data as the verified biometric data in the database with the proof of age information.

20. At least one non-transitory memory storage module having computer instructions stored thereon executable by one or more processing modules to:
receive a transmission indicating an intention by a customer to purchase an item via a mobile device, wherein receive the transmission comprises:
receive the transmission that the customer has scanned, with the mobile device, a unique identifier of the item to be purchased;
coordinate a first display of item information for the item on the mobile device of the customer;
receive a purchase confirmation of the item from the mobile device of the customer;
coordinate a second display of one or more item suggestions on the mobile device of the customer; and
receive a check-out process initiation for the item from the mobile device of the customer;
determine if the item is subject to an age-restriction; and
if the item is subject to the age-restriction:
confirm an identity of the customer;
determine an age of the customer after confirming the identity of the customer; and
allow the customer to purchase the item if the age of the customer satisfies the age-restriction for the item.

\* \* \* \* \*